United States Patent
Kim

(10) Patent No.: US 10,736,159 B2
(45) Date of Patent: Aug. 4, 2020

(54) DISPLAY CONNECTION SYSTEM AND METHOD FOR VEHICLE

(71) Applicants: Hyundai Motor Company, Seoul (KR); Kia Motors Corporation, Seoul (KR)

(72) Inventor: Yong Kim, Hwaesong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 162 days.

(21) Appl. No.: 16/058,696

(22) Filed: Aug. 8, 2018

(65) Prior Publication Data

US 2019/0215882 A1 Jul. 11, 2019

(30) Foreign Application Priority Data

Jan. 8, 2018 (KR) ........................ 10-2018-0002280

(51) Int. Cl.
| | | |
|---|---|---|
| *H04W 76/00* | (2018.01) | |
| *H04W 84/12* | (2009.01) | |
| *G06F 3/048* | (2013.01) | |
| *H04W 76/14* | (2018.01) | |
| *G06F 3/14* | (2006.01) | |
| *H04W 4/48* | (2018.01) | |
| *G06K 7/14* | (2006.01) | |
| *G06F 3/0482* | (2013.01) | |
| *G06F 3/0488* | (2013.01) | |

(52) U.S. Cl.
CPC .......... *H04W 76/14* (2018.02); *G06F 3/1423* (2013.01); *G06K 7/1417* (2013.01); *H04W 4/48* (2018.02); *G06F 3/0482* (2013.01); *G06F 3/04886* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 10,110,648 B2* | 10/2018 | Yang | H04L 65/4092 |
| 10,235,122 B1* | 3/2019 | Goel | G02B 27/0093 |
| 2014/0120829 A1* | 5/2014 | Bhamidipati | H04N 21/42207 455/3.06 |
| 2015/0339334 A1* | 11/2015 | Hanke | H04L 67/306 707/736 |
| 2017/0195708 A1* | 7/2017 | Morales | H04N 21/41407 |
| 2019/0114039 A1* | 4/2019 | Lindemann | B60K 37/06 |

FOREIGN PATENT DOCUMENTS

| | | |
|---|---|---|
| EP | 2 211 499 A1 | 7/2010 |
| JP | 2008-026181 A | 2/2008 |
| KR | 10-0175952 B1 | 5/1999 |
| KR | 10-2014-0048729 A | 4/2004 |
| KR | 10-2008-0022327 A | 3/2008 |
| KR | 10-2012-0123941 A | 11/2012 |

* cited by examiner

*Primary Examiner* — Scott M Sciacca

(74) *Attorney, Agent, or Firm* — Morgan, Lewis & Bockius LLP

(57) ABSTRACT

A display connection system may include a head unit provided in a vehicle, a plurality of display apparatuses provided in the vehicle to receive data from the head unit, and a mobile device configured to recognize a QR code generated by the head unit to establish connection with the head unit via Wi-Fi and to transmit display data to the head unit.

14 Claims, 3 Drawing Sheets

DISPLAY CONNECTION SYSTEM AND METHOD FOR VEHICLE

The present application claims the benefit of Korean Patent Application No. 10-2018-0002280, filed on Jan. 8, 2018, the entire contents of which is incorporated herein for all purposes by this reference.

BACKGROUND OF THE INVENTION

Field of the Invention

The present invention relates to a display connection system and method for a vehicle.

Description of Related Art

The description of this section only provides the background information related to embodiments but does not constitute prior art.

To provide convenience to vehicle passengers, an audio/video/navigation/telematics (AVNT) system is being built in a vehicle. Such an AVNT system may be connected to a device carried by a user who rides in the vehicle.

When the AVNT system is connected to the device, the AVNT system may receive data from the device and use the data, providing user convenience.

The vehicle may include a display apparatus. When a head unit provided in the vehicle to control the AVNT system, the display apparatus and the device are connected to each other, data on video and audio transmitted from the device may be transmitted to the display apparatus and the display apparatus may provide video and audio, providing user convenience.

In the related art, a connection method between the head unit and the device configured for data transmission and reception was determined by an operating system of the device.

In the related art, connection between the head unit and the device was established by performing Bluetooth pairing, that is, connecting the head unit with the device via Bluetooth, and then re-connecting the head unit with the device via the Wi-Fi.

When Bluetooth and Wi-Fi are both used, a connection process is troublesome. In particular, in the case of Bluetooth, compatibility between the device and the head unit may be problematic. Considerable time, cost and effort are required to solve such a problem.

In the related art, since a connection option between the head unit and the device is simple, when a plurality of display apparatuses is provided in the vehicle, all the display apparatuses may operate. Therefore, there is a problem that the range of user's choice is limited and the advantage of the wireless connection between the head unit and the device cannot be utilized well.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a display connection system and method for a vehicle that substantially obviate one or more problems due to limitations and disadvantages of the related art.

Various aspects of the present invention are directed to providing a display connection system and method for a vehicle, which are configured for improving reliability and user convenience.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

To achieve these objects and other advantages and in accordance for an exemplary embodiment of the present invention, as embodied and broadly described herein, a display connection system may include a head unit provided in a vehicle, a plurality of display apparatuses provided in the vehicle to receive data from the head unit, and a mobile device configured to recognize a QR code generated by the head unit to establish connection with the head unit via Wi-Fi and to transmit display data to the head unit.

According to various aspects of the present invention, a display connection method may include a head unit of a vehicle selecting a connection menu for connecting display apparatuses provided in the vehicle with a mobile device, collecting characteristic information related to an apparatus provided in the vehicle to generate a QR code corresponding to the connection menu selected by the head unit, the head unit generating the QR code, the device recognizing the QR code, and connecting the head unit with the device via Wi-Fi and transmitting data from the device to the head unit according to information contained in the QR code.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
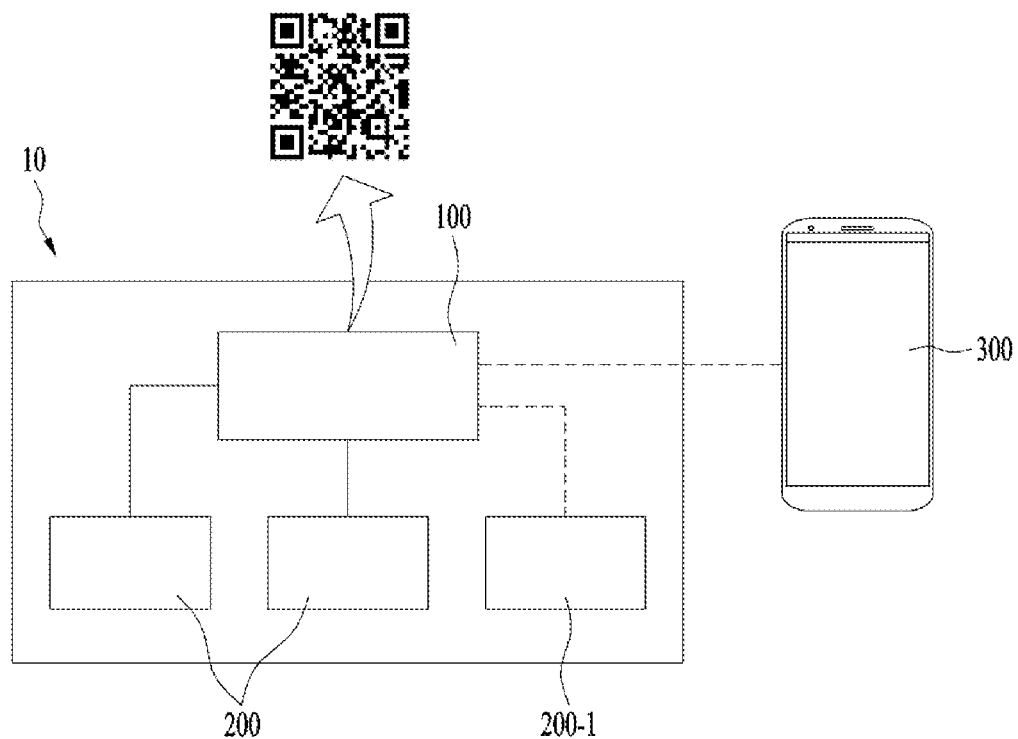
FIG. 1 is a view illustrating a display connection system according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, embodiments will be described in detail with reference to the accompanying drawings. It is to be understood that both the foregoing general description and the following detailed description of the present invention are exemplary and explanatory, and are intended to provide further explanation of the present invention as claimed. It is to be understood, however, that the appended claims are intended to cover all modifications, equivalents, and alternatives within the spirit and scope of the embodiments.

It will be understood that, although the terms first, second, etc. may be used herein to describe various elements, these elements may not be limited by these terms. These terms are only used to distinguish one element from another. Further. Furthermore, terms specifically defined in consideration of the configuration and operation of the exemplary embodiment are only intended to illustrate the embodiments, and do not limit the scope of the embodiments.

In the following description of the embodiments, it will be understood that, when each element is referred to as being formed "on" or "under" the other element, it may be directly "on" or "under" the other element or be indirectly formed with one or more intervening elements therebetween. Furthermore, it will also be understood that "on" or "under" the element may mean an upward direction and a downward direction of the element.

Furthermore, the relative terms "first" and "second", "top/upper/above", "bottom/lower/under" and the like in the description and in the claims may be used to distinguish between any one substance or element and other substances or elements and not necessarily for describing any physical or logical relationship between the substances or elements or a particular order.

FIG. 1 is a view illustrating a display connection system according to an exemplary embodiment of the present invention. The display connection system according to the exemplary embodiment may include a head unit 100, display apparatuses 200 and a device 300.

The head unit 100 and the display apparatuses 200 are provided in a vehicle 10, and the device 300 is a mobile device and may be carried by a user who rides in the vehicle 10. The device 300 may be, for example, a smartphone, a tablet, etc.

The head unit 100 may manage and control an audio/video/navigation/telematics (AVNT) system in which apparatuses disposed in a vehicle are incorporated to provide convenience to vehicle passengers. In the exemplary embodiment of the present invention, the function of the head unit 100 provided in the vehicle to control the display apparatuses 200 configured for transmitting data to the device 300 will be focused upon.

A plurality of display apparatuses 200 may be provided in the vehicle to receive data from the head unit 100. The display apparatuses 200 may receive video or audio data from the head unit 100 and reproduce video or audio.

Referring to FIG. 1, the display apparatuses 200 may include a fixed display apparatus 200 disposed in the vehicle and a mobile display apparatus 200-1 carried by a user. The mobile display apparatus 200-1 may be a smartphone, a table, etc.

The head unit 100 and the fixed display apparatus 200 may be continuously connected by wire or wirelessly. The mobile display apparatus 200-1 may be connected to the head unit 100 through a separate connection process.

The mobile display apparatus 200-1 and the head unit 100 may be connected through short-range communication means such as Bluetooth, Wi-Fi, NFC, etc. As another exemplary embodiment of the present invention, the mobile display apparatus 200-1 and the head unit 100 may be connected using a detachable connection cable.

The device 300 may recognize a QR code generated by the head unit 100 to be connected to the head unit 100 via Wi-Fi and transmit display data to the head unit 100. Connection between the device 300 and the head unit 100 using the QR code will be described in detail below.

Figure 2:
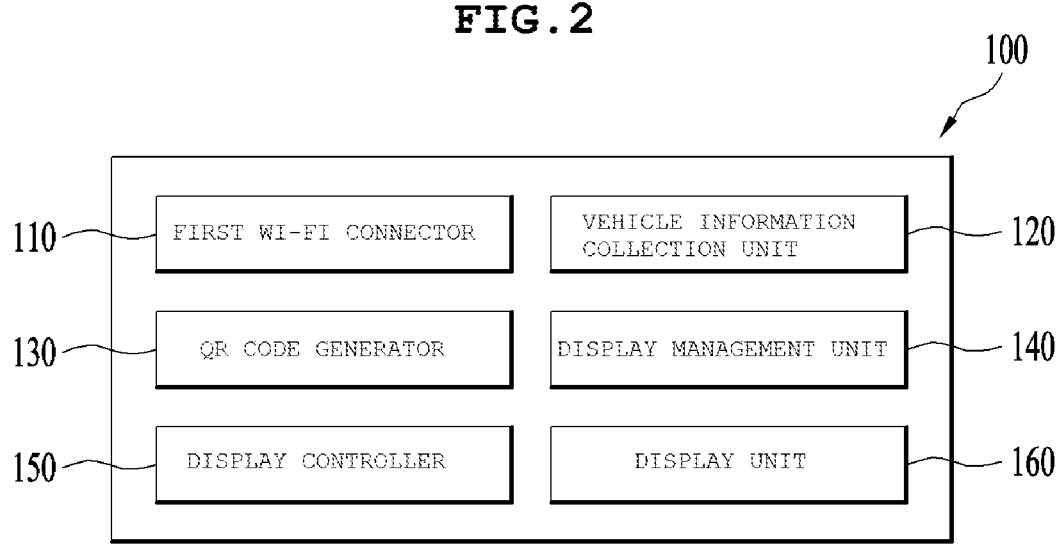
FIG. 2 is a view illustrating a head unit according to an exemplary embodiment of the present invention.

FIG. 2 is a view illustrating the head unit 100 according to the exemplary embodiment of the present invention. As shown in FIG. 2, the head unit 100 may include a first Wi-Fi connector 110, a vehicle information collection unit 120, a QR code generator 130, a display management unit 140, a display controller 150 and a display unit 160.

The display unit 160 may display various menus for facilitating the head 100 to control the display apparatuses 200. The head unit 100 may include an application to implement various menus for controlling the display apparatuses 200 on the display unit 160 in a soft key manner.

Furthermore, the QR code generated by the head unit 100 may be displayed on the display unit 160 such that the device 300 recognizes the QR code.

The first Wi-Fi connector 110 may control Wi-Fi connection with the device 300. Accordingly, the head unit 100 may be connected for transmission and reception of data to and from the device 300 through the first Wi-Fi connector 110.

The vehicle information collection unit 120 may collect vehicle information for connection between the head unit 100 and the display apparatuses 200. The vehicle information collection unit 120 may collect, for example, Wi-Fi connection, a driver's seat position, the number of display apparatuses 200, the positions of the display apparatuses 200 and information required for operation of the display apparatuses 200.

The QR code generator 130 may generate a QR code including a display option selected by a user and a display command according to the vehicle information received from the vehicle information collection unit 120. Accordingly, the QR code generated by the QR code generator 130 may include information necessary for operation of the display apparatuses 200.

The display management unit 140 may manage information on the plurality of display apparatuses 200 provided in the vehicle. The information on the display apparatuses 200 may include, for example, the resolution of the display apparatuses 200, whether touchscreen type input is supported, whether there are physical buttons such as a hard keys and whether a microphone is supported.

The display management unit 140 may manage not only information on the fixed display apparatus 200 but also information on the mobile display apparatus 200-1. That is, the display management unit 140 may connect the mobile display apparatus 200-1 provided in the vehicle with the head unit 100 and manage information on the mobile display apparatus 200-1.

Meanwhile, the display management unit 140 may recognize change in information on the display apparatuses 200 and continuously update the information on the display apparatuses 200.

The display controller 150 may control operation of the display apparatuses 200 according to the information on the display apparatuses 200 received from the display management unit 140.

The display controller 150 may transmit the data received from the device 300 to the display apparatuses 200 and control the display apparatuses 200 such that the display apparatuses 200 reproduce video or audio.

That is, when the head unit 100 and the device 300 are connected via Wi-Fi, the display controller 150 may transmit the data received from the device 300 to the display apparatuses 200 and output video on the display apparatuses 200.

Figure 3:
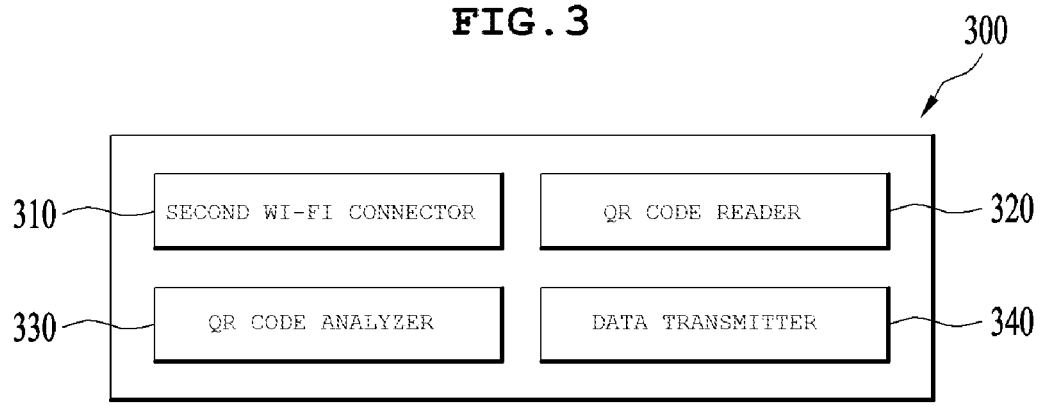
FIG. 3 is a view illustrating a device according to an exemplary embodiment of the present invention.

FIG. 3 is a view illustrating the device 300 according to an exemplary embodiment of the present invention. As shown in FIG. 3, the device 300 may include a second Wi-Fi connector 310, a QR code reader 320, a QR code analyzer 330 and a data transmitter 340.

The second Wi-Fi connector 310 may control Wi-Fi connection with the head unit 100. Accordingly, the device 300 may be connected for transmission and reception of data to and from the head unit 100 through the second Wi-Fi connector 310.

The QR code reader 320 may recognize the QR code generated by the head unit 100. For example, the QR code reader 320 may include a camera module disposed in the device 300 and a logic system connected to the camera module to recognize the QR code.

The QR code analyzer 330 may analyze information contained in the QR code recognized by the QR code reader 320. The information analyzed by the QR code analyzer 330 may be transmitted to the data transmitter 340.

The data transmitter 340 may transmit, to the head unit 100, video output data according to the information contained in the QR code received from the QR code analyzer 330. The data transmitted from the data transmitter 340 to the head unit 100 may be related to video or audio processed to match the information contained in the QR code.

Figure 4:
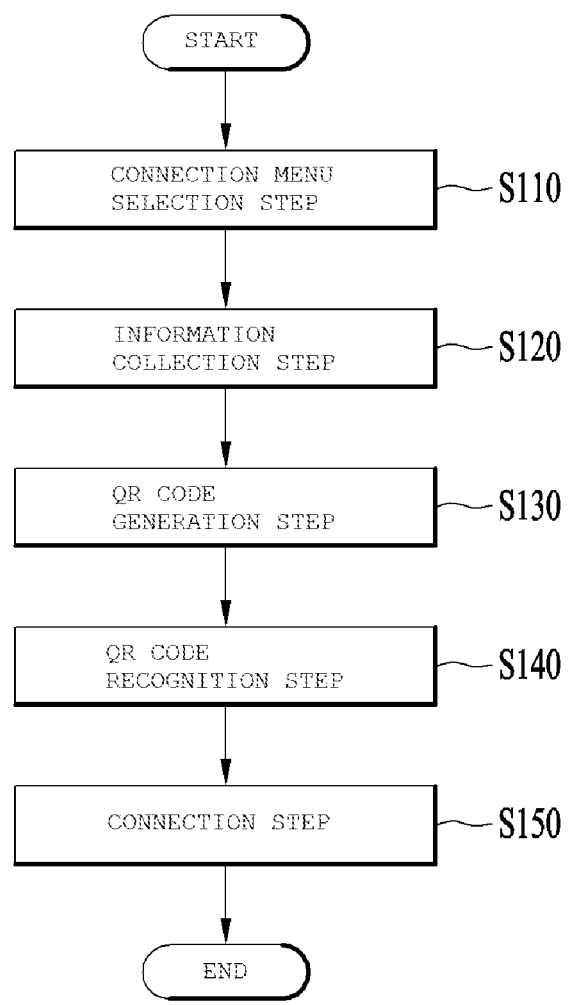
FIG. 4 is a flowchart illustrating a display connection method according to an exemplary embodiment of the present invention.

FIG. 4 is a flowchart illustrating a display connection method according to an exemplary embodiment of the present invention. The display connection method may include a connection menu selection step S110, an information collection step S120, a QR code generation step S130, a QR code recognition step S140 and a connection step S150.

In the connection menu selection step S110, the head unit 100 of the vehicle may select a connection menu for connecting the display apparatuses 200 provided in the vehicle with the mobile device 300.

As described above, a plurality of display apparatuses 200 may be provided in the vehicle. In the connection menu selection step S110, the head unit 100 may select whether all or some of the plurality of display apparatuses 200 operate and an operation state thereof.

The operation state may be, for example, selection of whether the display apparatuses 200 reproduce only video or reproduce video and audio. Of course, the operation state may be set such that some of the plurality of display apparatuses 200 reproduce only video and the remaining display apparatuses reproduce video and audio.

When the user selects the connection menu and inputs the connection menu through an input device provided in the head unit 100, the head unit 100 may select the connection menu for connecting the display apparatuses 200 to the mobile device 300 according to the input command.

In the information collection step S120, the characteristic information related to the display apparatus provided in the vehicle may be collected to generate the QR code corresponding to the connection menu selected by the head unit 100.

For example, the characteristic information may include Wi-Fi connection, a driver's seat position, the number of display apparatuses 200, the positions of the display apparatuses 200 and information required for operation of the display apparatuses 200. In the information collection step S120, the head unit 100 may collect such characteristic information.

Information on Wi-Fi connection may be information on a Wi-Fi system included in the head unit 100, which is required to connect the head unit 100 with the device 300 via Wi-Fi. Such information on Wi-Fi connection may include an SSID and a password of a Wi-Fi access point (AP).

Information on the driver's seat position may be information on which of the left and right sides of the vehicle a driver's seat is located. The head unit 100 includes a graphical user interface (GUI). In the GUI, the arrangement positions of command buttons of a touchscreen type, that is, a soft key type, may be changed according to the driver's seat position.

The GUI is provided to enable the driver to operate the display apparatuses 200 using the touchscreen type command buttons provided in the GUI. Accordingly, various types of command buttons provided in the GUI may be disposed to be easily manipulated by the driver.

Accordingly, in the exemplary embodiment of the present invention, the command buttons of the GUI may be disposed according to the driver's seat position such that the driver operates the command buttons. For example, in the case of right hand drive (RHD), that is, when the driver's seat is located at the right side of the vehicle and the GUI is located at the front left side of the driver's seat, soft key type main command buttons including a home button included in the GUI are provided at the right side of the GUI, providing convenience to the driver.

As an exemplary embodiment of the present invention, arrangement of the command buttons of the GUI may be set by the head unit 100 in consideration of the driver's seat position and the position of the GUI.

As another exemplary embodiment of the present invention, arrangement of the command buttons of the GUI may be set by the device 300 and transmitted to the head unit 100, and the head unit 100 may display the arrangement state of the command buttons according to the transmitted information on arrangement of the command buttons.

That is, the device 300 may set the arrangement positions of the command buttons of the GUI, and, after the head unit 100 and the device 300 are connected to each other via Wi-Fi, the device 300 may transmit information on the arrangement positions of the command buttons of the GUI to the head unit 100. The head unit 100 may arrange the command buttons according to the received information on the arrangement positions of the command buttons of the GUI.

The information on the positions of the display apparatuses 200 may be used to verify whether operations of the display apparatuses 200 are restricted. The head unit 100 may determine the positions of the display apparatuses 200 and collect information on the display apparatuses 200, operations of which are restricted when the vehicle travels, based on the positions of the display apparatuses 200.

For example, operations of the display apparatuses 200 provided adjacent to the front seat including the driver's seat of the vehicle may be prohibited in order to reduce traffic accidents caused by driver inattention.

Accordingly, the head unit 100 may determine the positions of the display apparatuses 200, collect information on a display apparatus 200 located at a position where operation is prohibited, and control operations of the display apparatuses 200 based on the collected information.

Such information may be transmitted to the device 300 through the QR code. Based on the transmitted information, the device 300 may transmit, to the head unit 100, a command signal for preventing the display apparatus 200 located at the position where operation is prohibited from operating.

Information required for operations of the display apparatuses 200 may include, for example, whether each of the display apparatuses 200 supports a microphone, whether each of the display apparatuses 200 supports touchscreen type input, and information on the resolution of the display apparatuses 200.

Furthermore, information required for operations of the display apparatuses 200 may be information on hard keys and a controller system used for interlocking of the device 300, the head unit 100 and the display apparatuses 200.

The head unit 100 may collect information as to whether each of the display apparatuses 200 supports the microphone and transmit the collected information to the device 300 through the QR code.

The device 300 may verify whether each of the display apparatuses 200 supports the microphone according to the received information and transmit, to the head unit 100, data for reproducing video or audio in consideration of the characteristics of the display apparatuses 200.

The head unit 100 may collect the information as to whether each of the display apparatuses 200 supports touchscreen type information and transmit the collected information to the device 300 through the QR code.

The device 300 may verify whether each of the display apparatuses 200 supports touchscreen type input according to the received information and transmit, to the head unit 100, data for reproducing video or audio in consideration of the characteristics of the display apparatuses 200.

The head unit 100 may collect the information on the resolution of the display apparatuses 200 and transmit the collected information to the device 300 through the QR code.

The device 300 may verify the resolution of the display apparatuses 200 according to the received information and transmit data for reproducing video with resolution corresponding to the resolution of the display apparatuses 200 to the head unit 100.

The head unit 100 may collect information on hard keys and a controller system used for interlocking of the device 300, the head unit 100 and the display apparatuses 200 and determine whether the hard keys and the controller system are interlocked based on the collected information.

That is, the head unit 100 may determine whether the hard keys, that is, the physical keys, used for interlocking of the device 300, the head unit 100 and the display apparatuses 200 are present in the head unit 100 and the display apparatuses 200.

If the hard key is present, the head unit 100 may determine whether the hard key is interlocked to operate the head unit 100 or the device 300 even when the hard key is not used by the user.

Furthermore, the head unit 100 may determine whether the controller system used for interlocking of the device 300, the head unit 100 and the display apparatuses 200, such as an integrated controller system, is provided in the vehicle.

If the controller system is present, the head unit 100 may determine whether the controller system is interlocked to operate the head unit 100 or the device 300.

The result determined by the head unit 100 may be transmitted to the device 300 through the QR code. The device 300 may transmit, to the head unit 100, data for reproducing video or audio in consideration of information on whether the hard keys and the controller system used for interlocking of the device 300, the head unit 100 and the display apparatuses 200, according to the received information.

In the QR code generation step S130, the head unit 100 may generate the QR code. In the QR code generation step (S130), the head unit 100 may generate the QR code according to the connection menu selected in the connection menu selection step S110 and the information collected in the information collection step S120. The generated QR code may be displayed on the display unit 160 of the head unit 100 to be recognized by the device 300.

Accordingly, the generated QR code may have the following string format, for example.

For example, if each of the display apparatuses 200 supports touchscreen type input, the integrated controller system is interlocked and the fixed display adjacent to the seats located at the front side of the vehicle operates, the string format of the QR code is as follows.

SSID:AP1;PW:XXXXXX;DYPE:LHD;DisNUM: 1;
DisPos:Front;Touch:Y;CCP:Y;Resoultion:1920×720;
Mic:Y;

For example, if each of the display apparatuses 200 does not support touchscreen type input, the integrated controller system is interlocked and the fixed display adjacent to the seats located at the front side of the vehicle operates, the string format of the QR code is as follows.

SSID:AP1;PW:XXXXXX;DYPE:LHD;DisNUM:3;
DisPos:RearRight;Touch:N;CCP:Y;Resoultion:800×480;
Mic:N;

The QR code may include a variety of information according to the menu selected by the user and the information collected by the head unit 100. Therefore, whenever the QR code generation step S130 is repeatedly performed, the QR code may be generated in different forms.

In the QR code recognition step S140, the device 300 may recognize the QR code. As described above, the QR code reader 320 provided in the device 300 may recognize the QR code displayed on the head unit 100 and the QR code analyzer 330 provided in the device 300 may analyze the information contained in the QR code.

In the connection step S150, the head unit 100 and the device 300 may be connected to each other via Wi-Fi. Wi-Fi connection may be performed as the device 300 recognizes the information on Wi-Fi connection contained in the QR code.

Furthermore, in the connection step S150, the device 300 may be configured to transmit data to the head unit 100 according to the information contained in the QR code.

After the connection step S150 is finished, the device 300 may continuously transmit the data on video or audio reproduced by the display apparatuses 200 to the head unit 100, and, when Wi-Fi connection between the head unit 100 and the device 300 is finished, data transmission of the device 300 may be finished.

In the exemplary embodiment of the present invention, since the connection step S150 between the head unit 100 and the device 300 via Bluetooth is not performed, there is no need to provide a separate Bluetooth module in the vehicle, thereby reducing cost.

In the exemplary embodiment of the present invention, since the connection menu between the display apparatuses 200 and the device 300 may be selected by the user, the characteristic information related to the display apparatus provided in the vehicle and the connection menu may be collected and display options for the display apparatuses 200 may be implemented based on the characteristic information related to the apparatuses and the connection menu, it is possible to provide convenience to the user.

In the exemplary embodiment of the present invention, since information on Wi-Fi connection between the head unit 100 and the device 300 may be concealed in the QR code, it is possible to efficiently prevent information leakage upon Wi-Fi connection and upon accessing the Wi-Fi AP.

In the exemplary embodiment of the present invention, since there is no need to provide a separate Bluetooth module in the vehicle, there is no need to improve Bluetooth compatibility between the device 300 and the head unit 100 or to require extra time, cost and efforts to improve Bluetooth quality.

Furthermore, since Bluetooth connection reliability is not problematic, it is possible to increase reliability of connectivity between the head unit 100 and the device 300.

Furthermore, since Bluetooth connection between the device 300 and the head unit 100 is not established, it is possible to improve a connection speed between the device 300 and the head unit 100.

In the exemplary embodiment of the present invention, since the connection step between the head unit and the device via Bluetooth is not performed, there is no need to provide a separate Bluetooth module in the vehicle, thereby reducing cost.

In the exemplary embodiment of the present invention, since the connection menu between the display apparatuses and the device may be selected by the user, the characteristic information related to the display apparatus provided in the vehicle and the connection menu may be collected and display options for the display apparatuses may be implemented based on the characteristic information related to the apparatuses and the connection menu, it is possible to provide convenience to the user.

In the exemplary embodiment of the present invention, since information on Wi-Fi connection between the head unit and the device may be concealed in the QR code, it is possible to efficiently prevent information leakage upon Wi-Fi connection and upon accessing the Wi-Fi AP.

In the exemplary embodiment of the present invention, since there is no need to provide a separate Bluetooth module in the vehicle, there is no need to improve Bluetooth compatibility between the device and the head unit or to require extra time, cost and efforts to improve Bluetooth quality.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A display connection system comprising:
    a head unit provided in a vehicle;
    a plurality of display apparatuses provided in the vehicle to receive data from the head unit; and
    a mobile device configured to recognize a Quick Response (QR) code generated by the head unit to establish connection with the head unit via Wi-Fi and to transmit display data to the head unit,
    wherein the head unit comprises:
        a first Wi-Fi connector configured to control Wi-Fi connection with the mobile device;
        a vehicle information collection unit configured to collect vehicle information for connection between the head unit and the plurality of display apparatuses;
        a QR code generator configured to generate the QR code including a display option selected by a user and a display command according to the vehicle information received from the vehicle information collection unit;
        a display management unit configured to manage information on the plurality of display apparatuses provided in the vehicle; and
        a display controller configured to control operation of the plurality of display apparatuses according to the information on the plurality of display apparatuses received from the display management unit, and
    wherein a collected vehicle information includes Wi-Fi connection, a driver's seat position, a number of the plurality of display apparatuses, and positions of the plurality of display apparatuses and information required for operations of the plurality of display apparatuses.

2. The display connection system according to claim 1, wherein the plurality of display apparatuses includes a mobile display apparatus, and
    wherein the display management unit connects the mobile display apparatus disposed in the vehicle with the head unit and manages information on the mobile display apparatus.

3. The display connection system according to claim 1, wherein the display controller transmits data received from the mobile device to the plurality of display apparatuses and outputs video on the plurality of display apparatuses, when the head unit and the mobile device are connected via the Wi-Fi.

4. The display connection system according to claim 1, wherein the mobile device includes:
    a second Wi-Fi connector configured to control Wi-Fi connection with the head unit;
    a QR code reader configured to recognize the QR code generated by the head unit;
    a QR code analyzer configured to analyze information contained in the QR code; and a data transmitter configured to transmit, to the head unit, video output data according to the information contained in the QR code.

5. A display connection method including:

selecting, by a head unit of a vehicle, a connection menu for connecting a plurality of display apparatuses provided in the vehicle with a mobile device;

collecting, by a vehicle information collection unit, information related to the plurality of display apparatuses provided in the vehicle in order to generate a Quick Response (QR) code corresponding to the connection menu selected by the head unit;

generating, by the head unit, the QR code;

recognizing, by the mobile device, the QR code; and connecting the head unit with the mobile device via Wi-Fi and transmitting data from the mobile device to the head unit according to information contained in the QR code, wherein the collecting of the information includes collecting Wi-Fi connection, a driver's seat position, a number of the plurality of display apparatuses, and positions of the plurality of display apparatuses and information required for operations of the plurality of display apparatuses.

6. The display connection method according to claim 5, wherein the selecting of the connection menu includes selecting whether all or some of the plurality of display apparatuses operate and an operation state of the plurality of display apparatuses.

7. The display connection method according to claim 5, wherein the head unit includes a graphical user interface (GUI), and wherein arrangement positions of touchscreen type command buttons provided in the GUI are changed according to the driver's seat position.

8. The display connection method according to claim 7, wherein the mobile device sets the arrangement positions of the command buttons of the GUI and, after the head unit and the mobile device are connected to each other via the Wi-Fi, the mobile device transmits information on the arrangement positions of the command buttons of the GUI to the head unit.

9. The display connection method according to claim 5, wherein the head unit determines the positions of the plurality of display apparatuses and collects information on the plurality of display apparatuses, operations of which are restricted when the vehicle travels, according to the positions of the plurality of display apparatuses.

10. The display connection method according to claim 5, wherein the head unit collects information as to whether each of the plurality of display apparatuses supports a microphone.

11. The display connection method according to claim 5, wherein the head unit collects information as to whether each of the plurality of display apparatuses supports touchscreen type input.

12. The display connection method according to claim 5, wherein the head unit collects information on resolution of the plurality of display apparatuses.

13. The display connection method according to claim 5, wherein the head unit collects information on hard keys and a controller system used for interlocking of the mobile device, the head unit and the plurality of display apparatuses.

14. The display connection method according to claim 5, wherein the generating of the QR code includes generating the QR code according to the selected connection menu and the collected information related to the plurality of display apparatuses.

* * * * *